March 8, 1949.  M. Y. SEATON  2,464,187
PROCESS FOR PREPARING FINELY DIVIDED MATERIALS
Filed May 20, 1943
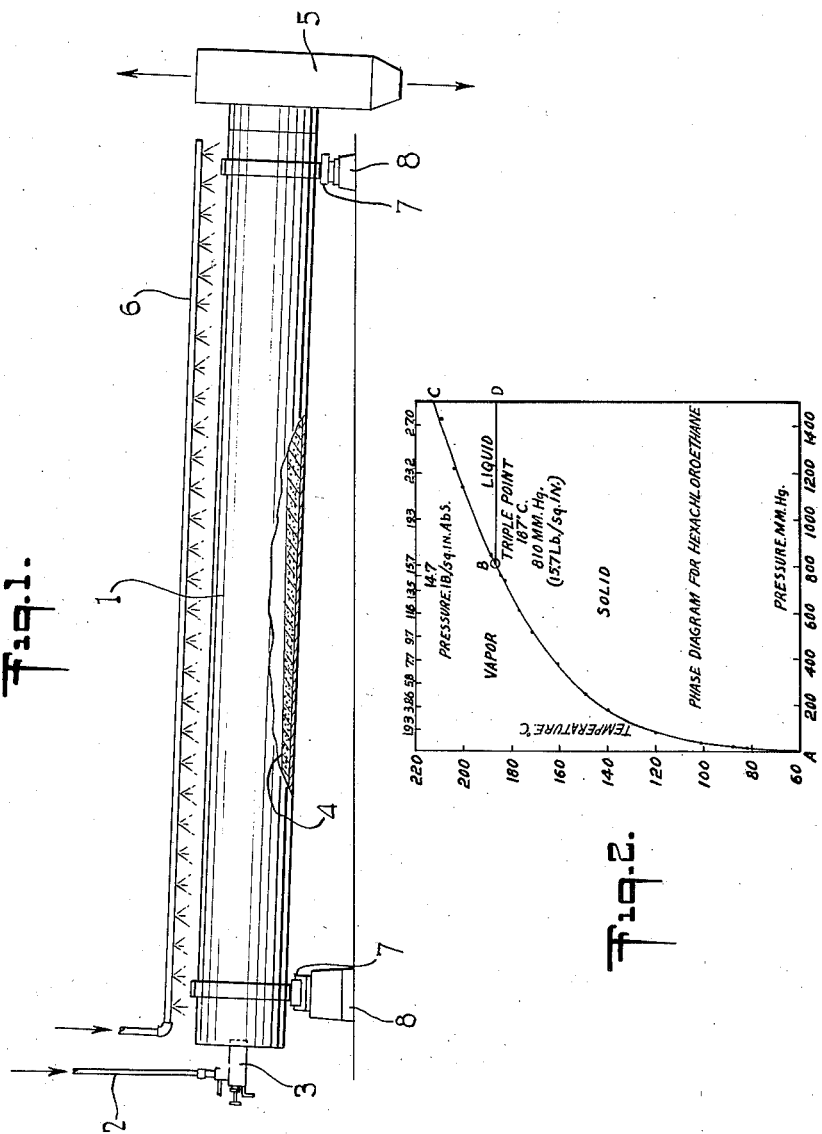
INVENTOR
MAX Y. SEATON
BY
AGENT Patented Mar. 8, 1949

2,464,187

UNITED STATES PATENT OFFICE 2,464,187

PROCESS FOR PREPARING FINELY DIVIDED MATERIALS

Max Y. Seaton, Greenwich, Conn., assignor to Food Machinery and Chemical Corporation, a corporation of Delaware Application May 20, 1943, Serial No. 487,821

4 Claims. (Cl. 18—47.2)

This invention relates to a process for utilizing the physical properties of materials to convert them into finely divided, non-adherent solid particles, and particularly it relates to a process for producing a finely divided, solid hexachlorethane powder by a process in which liquid hexachlorethane is injected into a rotating cylindrical shell under properly controlled conditions, such that the liquid is converted to a free-flowing powder.

For certain applications, it is desired to have substances in the form of free-flowing powders which are non-caking and which may be produced economically. Hexachlorethane, and anthraquinone represent the kind of materials that it is convenient to have in the form of powders.

In some applications it is desirable to have hexachlorethane in the form of a free-flowing powder, but its properties render it difficult to convert to this form. Under ordinary conditions of temperature and pressure, the hexachlorethane is a solid, but it does not have a normal melting point. At atmospheric pressure hexachlorethane sublimes at about 185° C., and at pressures and temperatures slightly above the triple point (at pressures above 15.7 pounds per square inch pressure absolute and temperatures above 187° C.), it exists as a liquid. In other words, it is necessary to put the material under pressure in order to get a liquid phase. At temperatures just below its melting point, freshly formed solid hexachlorethane has a loose, spongy structure, and is sticky and easily compressed into a hard, wax-like mass. It is not until hexachlorethane has been cooled to below about 70° C. that a non-adherent, crystalline form appears to exist. Ordinary methods for preparing hexachlorethane as a powder are not very satisfactory. One method which has been suggested involves cooling it in a mold and subsequently comminuting the solid form, but this method is expensive and difficult of operation. Likewise, other materials, such as those mentioned above, have physical properties that render them difficult to powder.

An object of my invention, therefore, is to provide a process whereby certain materials which exist either as solids or vapors, but not as liquids, under ordinary conditions of temperature and pressure may be converted into free-flowing, non-tacky, finely divided solids by a cheap and economical process.

Another object is to provide a process for converting substances which have triple points relatively near atmospheric pressure, either above or below, into free-flowing powders.

Another object is to produce a solid, finely divided, non-adherent powder from materials which, under ordinary conditions, pass from a solid to a vapor phase at atmospheric pressure.

Still another object is to provide a process whereby hexachlorethane may be produced as a non-adherent, finely divided material by an economical, commercially feasible process.

My invention has for further objects such additional operative advantages and improvements as may be found to obtain hereinbelow.

In connection with the invention, it should be noted that all pure compounds that are stable have a triple point which may be defined as that pressure and temperature at which the three phases of the compound—solid, liquid, and vapor—may exist in equilibrium simultaneously. Upon increasing either, the temperature or the pressure, with the other remaining constant, the three-phase equilibrium is destroyed, and at least one phase disappears; and likewise, a decrease in either, with the other remaining fast, limits the number of phases in equilibrium. In the case of some materials, such as hexachlorethane, the triple point is above atmospheric pressure. These substances cannot be melted by heating at atmospheric pressure, and they do not have normal boiling points. Other substances have triple points below atmospheric pressure. As examples, camphor, hexachlorbenzene, and anthraquinone might be noted. These substances will have normal boiling points and melting points. In the case of hexachlorethane, the triple point conditions are 15.7 pounds per square inch absolute and 187° C. All of the foregoing compounds have triple points within 1 atmosphere of atmospheric pressure and for the purposes of this invention are considered to be compounds having triple points near atmospheric pressure.

By taking advantage of the physical properties of materials having triple points at pressures relatively near atmospheric, I have discovered that they may be converted to finely divided, non-adherent solids if the material in a molten condition is injected in a stream into a rotating chamber in which the partial pressure of the material is maintained below the vapor pressure of the material at its triple point. When the liquid material is injected into the chamber where the partial pressure of the material is below the vapor pressure at its triple point, a portion of the liquid material vaporizes, which causes the remaining liquid to cool below its triple point temperature, resulting in its solidification, and the solid falls to the bottom of the chamber. The material which is vaporized passes to the walls of the chamber where it is condensed to a solid phase. By external cooling of the walls of the chamber, heat is removed from the solid particles and they are cooled to a point where the solid particles are non-adherent and do not tend to stick together. Finally, the material passes down the rotating chamber and is discharged from the opposite end of the chamber.

In the accompanying drawing:

Figure 1 illustrates more or less diagrammatically one embodiment of apparatus in which my invention may be practiced.

Figure 2 is a phase system diagram for hexachloroethane.

The material being treated in this particular case is hexachlorethane. It passes in a molten condition, under a pressure above 15.7 pounds per square inch absolute and a temperature somewhat above 187° C., its melting point, through line 2 to an injection unit 3, from which it is fed into the rotating chamber 1, rotated by rollers 7, mounted on supports 8. Since this chamber is open to the atmosphere, it is under about atmospheric pressure, so that when the liquid hexachlorethane is released from the nozzle 3, the pressure on it drops to atmospheric (14.7 pounds per square inch absolute), and a portion of the hexachlorethane vaporizes. This vaporization causes cooling of the remaining hexachlorethane, and it therefore solidifies into small particles. These particles drop to the bottom of the chamber 1 onto a bed 4 of previously cooled and solidified hexachlorethane maintained preferably at a temperature below about 70° C. The vaporized material passes to the walls of the chamber and is thereby solidified. Cooling water from line 6 is sprayed over the exterior of the chamber to remove heat from the condensed vapor material and also to cool the solidified material which drops to the bed 4. As the material passes down the chamber, the sublimed material and the solidified material from the nozzle intermix and are further cooled and form a continuous and homogeneous bed of free-flowing, powdered, non-tacky material 4, and finally the solid, powdered material discharges at 5. A slight negative pressure to reduce leakage of the hexachlorethane outward into the atmosphere is maintained by use of a vent line noted by the arrow pointing upwardly from the hood 5.

The phase system diagram for hexachlorethane is illustrated in Figure 2. In this figure pressures in millimeters of mercury or in pounds per square inch absolute are indicated as abscissae and temperatures are ordinates.

The curve AB represents the subliming points of hexachlorethane, the curve BC the boiling points of hexachlorethane and the line BD represents its melting point. The triple point is indicated at B. Above the line ABC hexachlorethane can exist only in a vapor phase. Below the line ABD hexachlorethane can exist only in a solid phase and in the area bounded by the lines DBC it exists only in a liquid phase. At the point B, which represents a temperature of 187° C. and a pressure of 15.7 pounds per square inch absolute, the three phases, solid, liquid and vapor, may exist in equilibrium simultaneously.

The bed in the rotating chamber 1 is usually maintained at a temperature below about 70° C. It prevents the freshly formed particles, which are at a much higher temperature, from contact with one another until they have had an opportunity to cool by external heat transfer through the walls of the chamber. By preventing contact, sticking or gumming of the particles together is eliminated, and balls or large aggregates of the particles do not form. In some cases, I use a rod or series of rods, or even an I-beam, in the rotating chamber to break up any aggregates of particles that may form. Usually, I prefer to cool the solid hexachlorethane below about 40° C. before discharging it from the rotating chamber.

The bed in the chamber is maintained and controlled by retainer rings at either end of the chamber and by the pitch of the chamber.

While I have shown cooling with water, it will be obvious to those skilled in the art that air cooling or other liquids may be used to replace the water as cooling media.

In the case of materials having a triple point above atmospheric pressure, operation of the unit will be substantially the same as that described for hexachlorethane, except, of course, temperature and pressure conditions must be adjusted to liquefy the product so that it can be sprayed or injected into the chamber, where the reduced pressure causes flash evaporation, thereby cooling the product and solidifying it in small beads or particles, which may be reduced in temperature by external heat transfer to the point where the particles do not agglomerate.

For substances having triple points below atmospheric pressure, it is necessary to keep the partial pressure of the material in the chamber below that of its vapor pressure at the triple point in order to secure flashing and vaporization of the liquid material when it is sprayed into the rotating chamber. This may be done in a number of ways, one of which is to introduce an inert diluent gas to the inlet end of the chamber along with the material to be solidified. This inert gas may be recirculated after reaching the exit end of the chamber and fed back to the inlet end. The purpose of this is to eliminate any possibility of a stable liquid phase in the chamber by keeping the partial pressure of the substance below the vapor pressure at the triple point. Another method of operation is to maintain the entire chamber under vacuum so that the total pressure inside the chamber is lower than the vapor pressure of the material at its triple point.

An advantage of this process is that it may be made continuous, thereby allowing large-scale production at low cost. It is adaptable to a wide range of materials that have triple points relatively near atmospheric pressure. The equipment required is ordinarily available, and an elaborate, expensive set-up is not necessary.

The process would produce some solid hexachlorethane if merely injected into the atmosphere, but in that case the vapor would be wasted. Economy in the process is secured by recovering the vapor in a solid, finely divided condition directly in the rotary chamber. The rotating chamber prevents any of the solidified vapor from building up on the walls and consequent pugging of the apparatus. Furthermore, the use of the rotary chamber allows easy maintenance of the cooling bed of solidified material. It also permits establishment of a temperature gradient in the bed from the inlet to the outlet end of the chamber, thereby slowly cooling the freshly formed particles.

While I have particularly described my invention hereinabove with respect to such materials as hexachlorethane, it will be obvious to those skilled in the art that it is not limited to the specific examples shown or to the specific temperature and pressure conditions outlined by me, but may be practiced and embodied within the scope of the claims hereinafter made.

What I claim is:

1. A method for preparing solid, finely divided, non-adherent hexachlorethane which comprises injecting the hexachlorethane in a molten condition into a rotating chamber maintained at about atmospheric pressure whereby a portion of the liquid hexachlorethane vaporizes, thereby cooling the remaining portion of the liquid hexachlorethane to a temperature below its melting point; maintaining a bed of finely divided solid hexachlorethane in the chamber as a diluent for the newly formed solid particles, abstracting heat from the vaporized material by external cooling of the walls of the chamber so that the vaporized portion of the hexachlorethane is condensed to a solid; and the bed of solid, finely divided hexachlorethane is maintained at a temperature at which the solid particles are non-adherent and free flowing, and discharging the solidified hexachlorethane from the rotating chamber.

2. The process of claim 1 in which the bed of hexachlorethane is at a temperature of below about 70° C.

3. The process of claim 1 in which the hexachlorethane leaves the rotating chamber at a temperature of about 40° C.

4. A method for preparing a finely divided, non-adherent solid from a material having a triple point near atmospheric pressure which comprises injecting said material in a liquid condition under temperature and pressure conditions approximating those of said triple point into a rotating chamber maintained at substantially atmospheric pressure, said pressure being below the vapor pressure at said triple point, whereby a portion of the liquid vaporizes, thereby cooling the liquid not vaporized to a temperature below its melting point, and solidifying it prior to coming in contact with the walls of said chamber; maintaining a bed of said material in a finely divided solid non-adherent form in the chamber as a diluent for the newly formed solid particles; abstracting heat by externally cooling the walls of the chamber to maintain a temperature therein at which the newly formed solid particles and the bed of solid, finely divided material are non-adherent and free-flowing and the vaporized portion of said material is condensed to a solid; and continuously discharging the solid material from the rotating chamber.

MAX Y. SEATON.

REFERENCES CITED

The following references are of record in the file of this patent:

UNITED STATES PATENTS

| Number | Name | Date |
|---|---|---|
| 1,464,844 | Downs | Aug. 14, 1923 |
| 1,601,898 | Wiley | Oct. 5, 1926 |
| 1,645,142 | Humphrey | Oct. 11, 1927 |
| 1,659,435 | Martin | Feb. 14, 1928 |
| 1,837,869 | Jewett | Dec. 22, 1931 |
| 1,884,313 | Small | Oct. 25, 1932 |
| 1,976,204 | Voorhees | Oct. 9, 1934 |
| 2,100,151 | Tretz | Nov. 23, 1937 |

FOREIGN PATENTS

| Number | Country | Date |
|---|---|---|
| 19,191 | Great Britain | June 10, 1915 |

OTHER REFERENCES

Thorpes Dictionary of Applied Chemistry, vol. 5, 1916 edition, Patent Office Scientific Library, designation TP9–T7, page 205. Copy in Div. 15.